Nov. 8, 1949　　W. C. CUDE　　2,487,044
COMPASS
Filed Oct. 1, 1945　　2 Sheets-Sheet 1
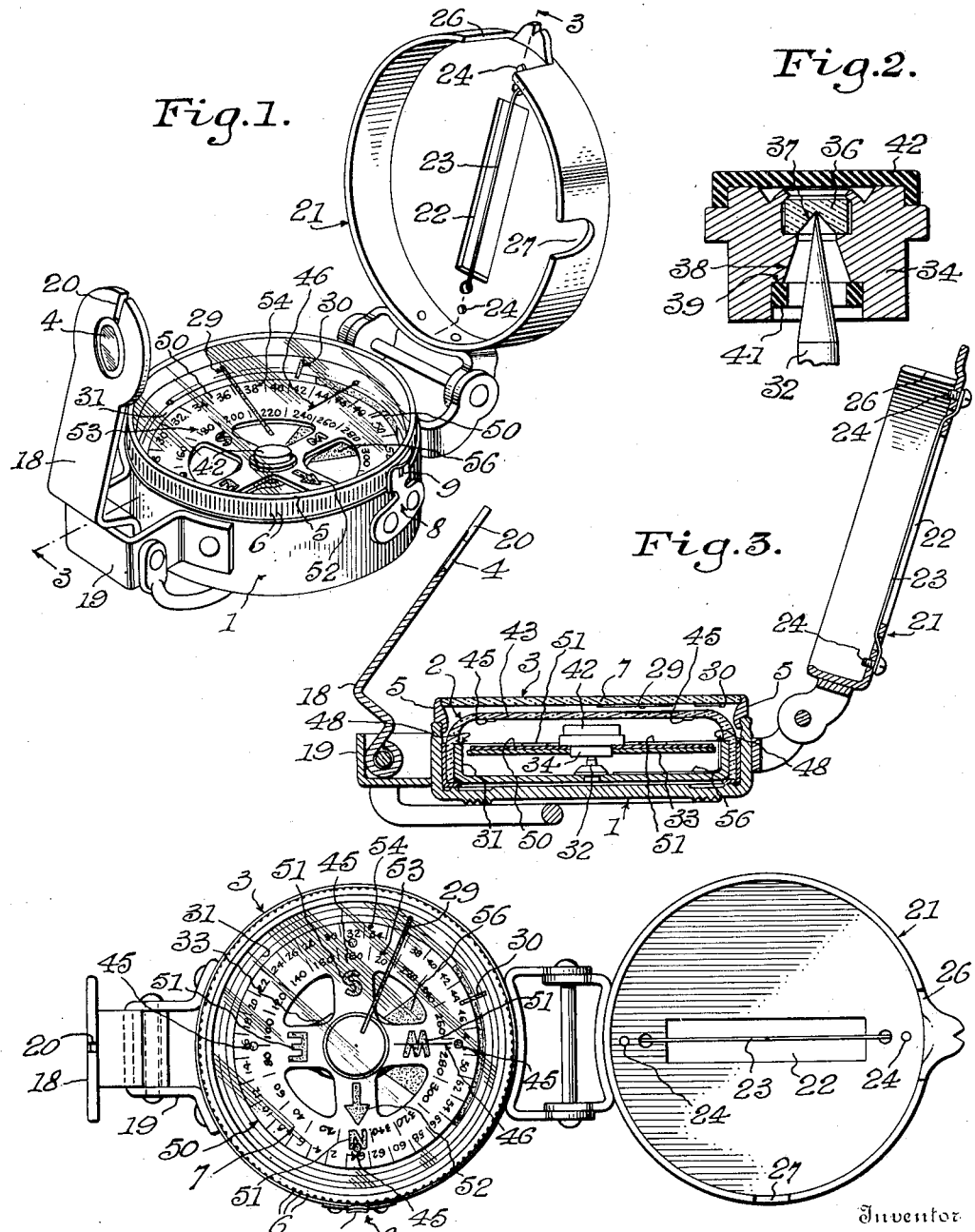
Inventor
William C. Cude Nov. 8, 1949 W. C. CUDE 2,487,044
COMPASS
Filed Oct. 1, 1945 2 Sheets-Sheet 2

Inventor
William C. Cude
By
Attorneys

Patented Nov. 8, 1949

2,487,044

UNITED STATES PATENT OFFICE 2,487,044

COMPASS

William C. Cude, United States Army

Application October 1, 1945, Serial No. 619,479½

4 Claims. (Cl. 33—222)

(Granted under the act of March 3, 1883, as amended April 30, 1928; 370 O. G. 757)

The invention described herein may be manufactured and used by or for the Government for governmental purposes, without payment to me of any royalty thereon.

This invention relates to compasses and particularly to eddy current dampened compasses suitable for day and night use without artificial light.

Prior compasses, and particularly lensatic compasses, have employed liquid filled capsules and clamp means in an effort to minimize the oscillation period of the needle, however, neither of these methods have proved very satisfactory. These prior compasses also have been provided with a few phosphorescent marked reference points to assist in taking reading at night in the absence of artificial light, however, these few markings were insufficient to give the degree of accuracy required in military use.

It is, therefore, an object of this invention to provide an eddy current dampening compass.

Another object of the invention is to provide a compass having a freely pivoted magnetic needle that will rapidly come to rest without the aid of liquid dampening means.

This invention has for another object means for determining accurate reading during the day and night without artificial light.

It is a further object of this invention to provide resilient mountings to eliminate noise created by the loosely constructed component parts of the compass.

A further object of this invention is to provide a compass shielded against external effects.

It is a still further object of this invention to provide a compass that will be simple, easy and economical in construction and efficient and durable in use.

The foregoing and other objects and advantages of this invention will be more clearly understood from reading the following specification, in conjunction with the drawings forming a part thereof, wherein:

Figure 1 is a perspective view of the lensatic form of compass of this invention;

Figure 2 is a detailed vertical section of the jewel mounting;

Figure 3 is a detailed vertical section taken on line 3—3 of Fig. 1, parts shown in elevation;

Figure 4 is a plan view of the lensatic compass as used for map orientation and reading;

Figure 5:
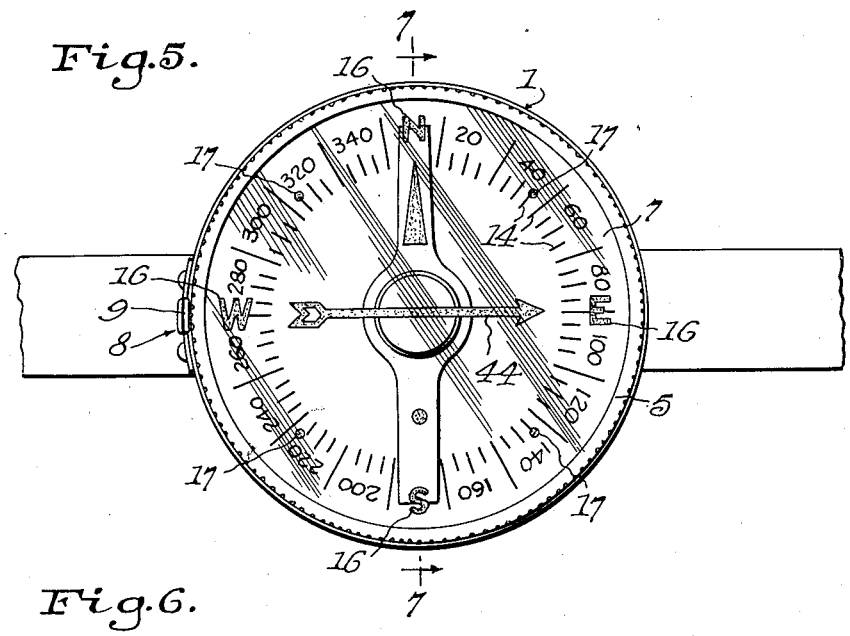
Figure 5 is a plan view of the wrist compass of this invention.

In the drawings wherein like members are given the same reference number, the compass is illustrated generally as a case 1 containing a needle capsule 2 and rotatable compass cover 3. The invention is illustrated in two forms, i. e., a lensatic compass and a wrist compass. Each form comprises component parts which are interchangeable. Hence, the following detailed description is written to describe each unit assembly of the two forms, with the understanding that parts are interchangeable, for example, the needle capsule of one form may be used in either case, and the same is true of the rotatable compass cover.

The case 1 of cylindrical cross-section is provided with a rotatably-mounted cover 3 comprising a bezel ring 5 having 120 equally spaced peripheral serrations 6, and a transparent disc 7 secured to said ring. A spring tab 8 is secured to the case and is provided with a projection 9 which engages the peripheral serrations 6 of the bezel ring 5.

Figure 6:
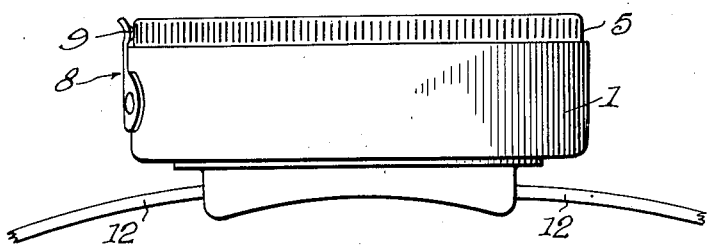
Figure 6 is a side elevation of Fig. 5.
Figure 7:
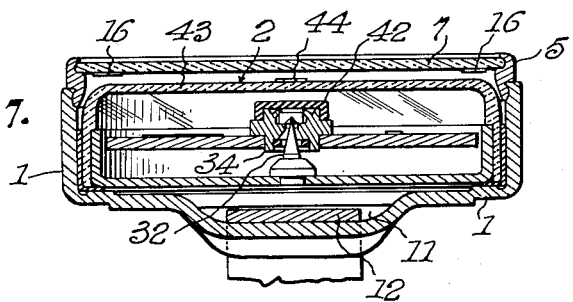
Figure 7 is a detailed vertical section taken on line 7—7 of Fig. 5, parts shown in elevation.

The wrist compass modification, see Figs. 6 and 7, has a hollow portion 11 provided in the bottom of the case which is adapted to receive a wrist strap 12. This modification has luminous calibrations 14 provided on the under side of the transparent disc 7 to provide durable rotatable indicia. These calibrations are in five degree (5°) units with the principal compass points (90° points) marked with luminous letters 16 and the intermediate midpoints (45° points) marked with luminous dots 17.

The lensatic form of compass has, basically, the same case as the wrist form compass. In the lensatic form, however, an arm 18 is pivotally mounted to a bracket 19 secured to the case 1. This arm 18 has a lens 4 mounted in the free end thereof, and an extended diametric narrow aperture 20 between the lens 4 and free end of said arm 18. A closure 21 is pivotally mounted to the case 1 diametrically opposite the arm 18, and provided with a diametric slot 22 having a fine wire sight 23 extending longitudinally therein and aligned with the aperture 20 in the arm 18. A luminous dot 24 is positioned at each end of the wire 23 and in alignment therewith for night sighting. The arm 18 is constructed and arranged to fold across the rotatably mounted compass cover 3 and the case closure 21 is constructed and arranged to fold over the arm 18, the case closure having cut-out portions 26 and 27 to receive the arm 18 and tab 8, respectively.

The transparent disc 7 in the lensatic compass is provided with luminous radial lines 29 and 30 on the under surface of the disc 7 and spaced 45 degrees (45°) apart to assist in setting predetermined angular measurement when used in conjunction with points 45 on the capsule cover 43 and the serrations 6 and tab 8.

The material for the compass case 1 in each modification is preferably aluminum to shield the compass from external effects, as well as provide a case that is easily stamped from sheets of this material and is durable under conditions of excessive and normally abusive use.

The needle capsule 2 comprises a copper cup 31 having a conical pivot 32 secured to the bottom thereof and extending inwardly in axial alignment therewith. The cup may be of other electric conductive material, and also may be in the form of a ring. The pivot 32 supports a jewel mounted magnetic needle 33 having a length slightly less than the diametric measurement of the cup 31 for maximum flux cutting by the cup and to accommodate slight tilt angles, such as 8 to 10 degrees. The jewel mounting comprises a non-magnetic setting 34, adapted to receive and retain a jewel 36, usually glass, fitted into the setting. The jewel has a conical complement recess 37 which receives the conical pivot 32, and registering with the recess 37 in the jewel is a similar conical complementary recess 38 in the setting 34 having an annular shoulder 39 to which is fitted a gasket 41, such as rubber or other resilient cushioning material. This gasket 41 is positioned to contact the pivot 32 when the compass is tilted a predetermined angle of 8 to 10 degrees. The jewel mounting is capped with a resilient cushion 42, preferably constructed of rubber. The capsule is closed with a transparent cover 43, which is fitted close enough to the jewel mounting cushion 42 to prevent the mounting falling off the pivot 32 when the case is inverted. The cover 43 is provided with an annular shoulder 48 which contacts the cup 31 to fix the distance between the cover 43 and mounting cushion 42.

In the wrist form compass, the transparent capsule cover 43 has a luminous arrow 44 diametrically positioned thereon which functions as a fixed index in demarking angular measurements; and the lensatic compass has the four principal compass points marked with luminous dots 45 and a radial line 46 terminating in one of said dots 45 which functions as a fixed index. The lensatic form, also, has a transparent dial 50 supported by and secured to the needle 33. The dial 50 has the principal points 51 of the compass luminously marked and a luminous radial pointer 52 terminating in the north marking, and degree and mil scales marked with thin black lines 53 and 54, respectively, which function as rotatable indicia.

The lensatic form has the interior of the cup 31 coated with a light reflective material such as white enamel, and a luminous segment 56 provided therein to assist in night reading. The luminous segment being positioned in the manner illustrated and described, causes the black markings 53 and 54 on the transparent dial to be legible at night.

In manufacturing the component parts of the compasses and assembling the parts into a complete structure, the various dimensions are such that the parts of one form of the compass may be employed in the other modifications thereof.

For the sake of clarity, each assembly will be described as illustrated in the drawings.

The lensatic case 1 is stamped from sheets of aluminum and assembled with the lens arm 18 and closure 21. The needle capsule 2 is assembled with the cup 31, conical pivot 32, jewel bearing supported needle 33 and cover 43, care being taken to position the cover 43 such that the radial line 46 bisects the luminous segment 56 in the cup 31. The capsule 2 is then inserted in the case and cemented thereto, with the capsule cover radial line 43 aligned with the case sighting aperture 20 and wire 23. The bezel ring 5 is then snapped into the case where it is held by coacting lugs on the case and ring and the spring tab 8.

The assembly of the wrist compass form is similar to that of the pocket modification. However, the capsule cover luminous diametric arrow 44 is aligned with the wrist strap 12.

In operation, both types of compasses are used to determine horizontal angular measurements in a clockwise direction from magnetic north. The lensatic type compass is held with the lens 4 focused on the dial 50. The line of sight of the eye being through the lens 4 to the dial 50 for angular readings; and through the slot 20 in the lens arm 18 to an object aligned with the closure wire 23 for objective identity. The compass is used frequently at night when it is both dangerous and awkward to employ artificial light for reading. The luminous segment 56 renders the black lines and numbers on the dial 50 legible, and the luminous dots 24 in the case closure 21 forms a sighting reference in lieu of the sighting wire 23 used in daylight. In the pocket modification, the compass is assembled with the diametric luminous arrow 44 aligned with the wrist strap 12 for convenience in sighting along the longitudinal axis of the arrow.

The serrations 6 on the bezel ring 5 being spaced to turn an angle of 3 degrees for each serration, and the 90 and 45 degree points being luminously marked, it is possible to set the compass to the nearest 45 degrees and turn the bezel ring to add or subtract 3 degrees for each serration until the desired point is located within a degree.

Having thus described my invention, what I claim as new and wish to secure by Letters Patent is:

1. A compass comprising a case, a copper cup inserted in said case, a pivot supported by said cup and extending inwardly in axial alignment therewith, a bearing supported by said pivot, a setting of non-magnetic material supported by said bearing, an annular sound cushioning gasket supported by said setting and surrounding said pivot, and a sound cushioning cap positioned over said setting, a magnetic needle supported by said bearing setting, a transparent cover for said cup, a rotatably mounted transparent cover for said case, and coacting fixed and rotatable indicia respectively located on said first-mentioned transparent cover and fixed relative to said needle, and adapted to define angular measurements relative to the normal pointing of the magnetic needle.

2. A compass comprising a case, a copper cup inserted in said case, a pivot supported by said cup and extending inwardly in axial alignment therewith, a bearing positioned on said pivot, a setting for said bearing and surrounding said pivot, a resilient sound dampening gasket attached to said setting and positioned to contact said pivot when the setting is tilted at an angle, a magnetic needle secured to said setting and having a length slightly less than the diameter of said cup, a transparent dial supported by said needle and having an opaque angular measurement scale positioned thereon, a luminous segment in said cup rendering the scale portion thereover legible in the absence of light, a resilient sound dampening cap for said bearing and setting, a cover for said cup having a fixed index cooperating with said dial scale to demark angular measurements from the normal pointing of the magnetic needle, and a transparent cover for said case.

3. A compass comprising a case, a copper cup inserted in said case, a pivot supported by said cup and extending inwardly in axial alignment therewith, a bearing positioned on said pivot, a setting for said bearing and surrounding said pivot, a gasket secured to said setting and positioned intermediate said setting and pivot, a magnetic needle secured to said setting, a transparent cover for said cup, a diametric luminous fixed index on said cup cover, a transparent case cover mounted on said case and rotatably movable in fixed angular distances, and angular measurement indicia provided on said case cover, adapted to define intermediate divisions on the index of said cup cover.

4. A compass comprising a case, a copper cup inserted in said case, a pivot supported by said cup and extending inwardly in axial alignment therewith, a bearing supported by said pivot, a setting of non-magnetic material supported by said bearing, an annular sound cushioning gasket supported by said setting and surrounding said pivot, and a sound cushioning cap positioned over said setting, a magnetic needle and a dial supported by said bearing setting, a transparent cover for said cup, a fixed pointer on said cover, a rotatably mounted transparent cover for said case, and rotatable indicia located on said dial cooperating with said fixed pointer to demark angular measurements relative to the normal pointing of the magnetic needle.

WILLIAM C. CUDE.

REFERENCES CITED

The following references are of record in the file of this patent:

UNITED STATES PATENTS

| Number | Name | Date |
|---|---|---|
| 2,003,179 | Faus | May 28, 1935 |

FOREIGN PATENTS

| Number | Country | Date |
|---|---|---|
| 1,818 | Great Britain | Feb. 4, 1915 |
| 14,083 | Great Britain | June 18, 1913 |
| 29,677 | Great Britain | Dec. 21, 1910 |
| 445,312 | Great Britain | Apr. 7, 1936 |
| 782,576 | France | Mar. 18, 1935 |